(12) United States Patent
Morita et al.

(10) Patent No.: US 7,343,669 B2
(45) Date of Patent: Mar. 18, 2008

(54) METHOD OF MANUFACTURING A THIN FILM MAGNETIC HEAD

(75) Inventors: Sumihito Morita, Niigata-ken (JP); Hideki Gochou, Niigata-ken (JP)

(73) Assignee: Alps Electric Co., Ltd, Tokyo (JP)

( * ) Notice: Subject to any disclaimer, the term of this patent is extended or adjusted under 35 U.S.C. 154(b) by 0 days.

(21) Appl. No.: 11/527,892

(22) Filed: Sep. 27, 2006

(65) Prior Publication Data

US 2007/0067983 A1   Mar. 29, 2007

(30) Foreign Application Priority Data

Sep. 29, 2005   (JP)   ............................ 2005-283169

(51) Int. Cl.
*G11B 5/127* (2006.01)
*H04R 31/00* (2006.01)

(52) U.S. Cl. ................... 29/603.16; 29/603.13; 29/603.15; 29/603.18; 216/62; 216/66; 216/67; 360/122; 360/126; 360/317; 427/127; 427/128; 451/5; 451/41

(58) Field of Classification Search .............. 29/603.13, 29/603.16, 603.18; 216/62, 66, 67; 360/121, 360/122, 126, 317; 427/127, 128; 451/5, 451/41

See application file for complete search history.

(56) References Cited

U.S. PATENT DOCUMENTS 6,204,997 B1 * 3/2001 Sasaki ........................ 360/123
6,538,846 B1   3/2003 Sato
2001/0026419 A1 * 10/2001 Watanabe et al. ........... 360/126
2001/0043433 A1 * 11/2001 Kanada et al. .............. 360/120
2002/0018317 A1 *  2/2002 Sato et al. .................. 360/126
2004/0070874 A1   4/2004 Sato

FOREIGN PATENT DOCUMENTS

JP   2001-52310    2/2001
JP   2001-110014   4/2001

* cited by examiner

*Primary Examiner*—Paul D. Kim
(74) *Attorney, Agent, or Firm*—Brinks Hofer Gilson & Lione (57) ABSTRACT

A manufacturing method of a thin film magnetic head is provided. In the manufacturing method of a thin film magnetic head, an inorganic insulating layer is formed along at least a sidewall surface of each conductor part. A gap of each conductor part is filled by an organic insulating layer. An upper surface of the conductor part, a magnetic pole portion, and a connecting layer are grinded to be planar with an organic insulating layer and an inorganic insulating layer. During an upper surface of each conductor part is grinded, the inorganic insulating layer, which is hard, suppresses a shear drop of each conductor part by grinding.

6 Claims, 7 Drawing Sheets

METHOD OF MANUFACTURING A THIN FILM MAGNETIC HEAD

This application claims the benefit of Japanese Patent Application 2005-283169 filed on Sep. 29, 2005, which is hereby incorporated by reference.

BACKGROUND

1. Field

The present embodiments relate to a thin magnetic film capable of suppressing short circuits between coil conductor parts, and filling the gaps of the coil conductor parts properly with an insulating layer.

2. Related Art

In the Patent Documents described below, there is disclosed a thin film magnetic head in which any magnetic pole portion is formed on the side of a surface facing a recording medium on a lower core layer. A connecting portion is formed on a height side on the lower core layer. A coil layer is formed on the lower core layer between the magnetic pole portion and the connecting portion through an insulating base layer. A gap between the magnetic pole layer and the connecting portion is magnetically connected at an upper core layer.

For example, with regard to a configuration of FIG. 2 of JP-A-2001-110014 (U.S. Pub. No. 2004/0070874 A1), which is described in [0080]~[0081] of JP-A-2001-110014 (US Pub. No. 2004/0070874 A1), it is preferable that the upper surface of the coil insulating layer 15 is flush with the upper surface of the coil layer 17. To make the upper surface of the coil insulating layer 15 and the upper surface of the coil layer 17 flush with each other, the CMP process, for example, may be used to etch the upper surface of the coil insulating layer 15 and the upper surface of the coil layer 17.

As shown in FIG. 2 of JP-A-2001-110014 (US Pub. No. 2004/0070874 A1), the thin film magnetic head has a structure that has an upper surface of a recording portion 14 and an upper surface of a layer formed on a height side of the recording portion 14 and are in one plane. It is preferable that the upper surface of a coil layer 17 is coplanar to the upper surface of the recording portion 14 in order to maximize the thickness of the first layer (lower layer side) of the coil layer 17. For this reason, the coil layer 17 shall be formed as high as an equivalent degree to the recording portion 14, using CMP process. The process comprising grinding the coil layer 17 together with the recording portion 14, and making the upper surface of the coil layer 17 and the upper surface of the recording portion 14 coplanar to each other. A film width of the coil layer 17 can be formed in the maximum, and a coil resistance of the coil layer can be lowered.

The lowering of the coil layer is preferable that an improvement of PTP (Pole Tip Protrusion) to lower the coil resistance of the coil layer.

The coil layer is formed of soft Cu. If a coil insulating layer filling gaps of the coil conductor parts is an organic material such as a resist, since the coil layer and the coil insulating layer are soft together, a shear drop is easily formed on an upper surface of the coil conductor part (generation of smear) by a grinding process by the CMP described above. Thus, a short circuit could be generated between each coil conductor part.

When filling a gap between the coil conductor part with an inorganic insulating layer instead of the organic material, although a generation of smear could be solved since the inorganic insulating layer is hard compared to the coil conductor part, a gap of each coil conductor part cannot be filled properly with the inorganic insulating layer by sputter technique, etc. For example, a hollow portion is easily formed in the proximity of a lower edge portion of each coil conductor part, since a width between each conductor part is very narrow compared to a tall coil conductor part. If such cavity is formed, a change in a film shape inside the thin film magnetic head was caused by an expansion of gas piled up in the hollow portion due to a heat generation when a magnetic head is driven.

In JP-A-2001-052310 (U.S. Pat. No. 6,538,846 B1), for example, as shown in FIG. 2, a protection layer 27 is provided on the coil conductor part. An upper surface of this protection layer 27 corresponds to an upper surface of a track width restricting portion 14 in a plane. Providing the protection layer 27 prevents an oxidization of a coil conductor part.

In JP-A-2001-052310 (U.S. Pat. No. 6,538,846 B1), a problem of a shear drop generation of the coil conductor part described above is not recognized. A means to solve the problem is not presented, and even if the protection layer 27 was a hard material and a shear drop generation of the coil conductor part was able to be suppressed, PTP cannot be properly improved, since a manufacturing process gets complicated as an original coil layer must be plated by a two-storied laminated structure and since a coil resistance increases if the specific resistance of the protection layer 27 is high. In JP-A-2001-052310 (U.S. Pat. No. 6,538,846 B1), the coil insulating layer is mainly formed of an inorganic insulating layer, and it is formed of a structure in which the hollow portion is easily generated.

SUMMARY OF THE INVENTION

A manufacturing method of a thin film magnetic head capable of suppressing a short circuit between the coil conductor parts, and properly filling a gap of the coil conductor part with an insulating layer is provided.

In a manufacturing method of a thin film magnetic head, the method includes the processes of: (a) forming a protrusion on a side of a surface facing a recording medium on a first magnetic portion, and a connecting portion for magnetically connecting the first magnetic portion to a second magnetic portion formed in (f), on a height side on the first magnetic portion; (b) forming a coil layer between the protrusion and the connecting portion on the first magnetic portion, through an insulating base layer; (c) forming an inorganic insulating layer along at least a sidewall surface of each conductor part constituting the coil layer; (d) filling a gap between each conductor part with an organic insulating layer; (e) etching an upper surface of the protrusion, an upper surface of each conductor part, and an upper surface of the connecting portion to a predetermined grinding position with the organic insulating layer and the inorganic insulating layer to expose each upper surface of the protrusion, each conductor part and connecting portion coplanarly; and (f) forming the second magnetic portion from the protrusion to the connecting portion.

According to another embodiment, in (c) process, an inorganic insulating layer is formed along at least each conductor part. In one exemplary method, in the (c) process, it is necessary to form the inorganic insulating layer from an upper edge between the upper surface and the sidewall surface of each conductor part along the sidewall surface, to at least a side lower than the grinding position in the (e) process.

By forming the inorganic insulating layer along a sidewall surface of each conductor part, in the (e) process, the hard inorganic insulating layer can suppress each conductor part from getting slack by grinding. Therefore, a short circuit between each conductor part can be prevented properly.

By filling a gap of each conductor part with an organic insulating layer in the (d) process, the gap of each conductor part can be filled properly without a cavity being formed.

For example, it is preferable that the inorganic insulating layer is formed by a chemical vapor deposition method. In particular, it is preferable that the inorganic insulating layer is formed by an atomic layer deposition method. In the chemical vapor deposition method, compared to a physical evaporation method such as sputter technique, it is easy to form the inorganic insulating layer properly to a sidewall surface of the conductor part which is lower than at least a grinding position even though an aspect ratio (a height size of a conductor part/a width size between each conductor part) of a gap of each conductor part is large. An atomic layer deposition method, (ALD Atomic Layer Deposition) which is a sort of a chemical vapor deposition method, forms a layer with a predetermined film thickness by piling an atomic layer, layer by layer. Thus, an inorganic insulating layer can be definitely formed on a sidewall surface in a space with a high aspect ratio.

It is preferable that an inorganic insulating material used for the inorganic insulating layer is selected from materials with a grinding speed slower than that of the conductor part and the organic insulating layer. It is also preferable that the inorganic insulating layer is selected from at least one of $Al_2O_3$, $HfO_2$, $TiO_2$ and $Ta_2O_5$.

A generation of a shear drop on the upper surface of the conductor part can be suppressed more properly.

Since the inorganic insulating layer is formed along at least a sidewall surface of each conductor part of the coil layer, the gap of each conductor part is filled by the inorganic insulating layer, and the upper surface of the coil layer is grinded to be planar with the first and connecting portion. Hereafter, a shear drop by a grinding of each conductor part of the hard inorganic insulating layer is suppressed (blocked) during grinding an upper surface of each conductor part is grinded. Accordingly, a short circuit of a gap of each conductor part gap can be suppressed properly.

By filling a gap of each conductor part with an inorganic insulating layer, the gap of each conductor part can be filled without forming a cavity between each conductor part.

BRIEF DESCRIPTION OF THE PRESENTLY PREFERRED EMBODIMENTS

A manufacturing method for a magnetic head according to exemplary embodiments will be described with reference to FIG. 1 to FIG. 9. According to the FIGS., the X direction is a track width direction, the Y direction is a height direction, and the Z direction a film width direction. Each direction is perpendicular to the other two directions. Each of FIGS. is a cross-sectional view of a cutting surface cut in a direction parallel to plane Y-Z. Further, "facing surface to recording medium" indicates a surface in a parallel direction to X-Z direction shown in the FIGS.

Figure 1:
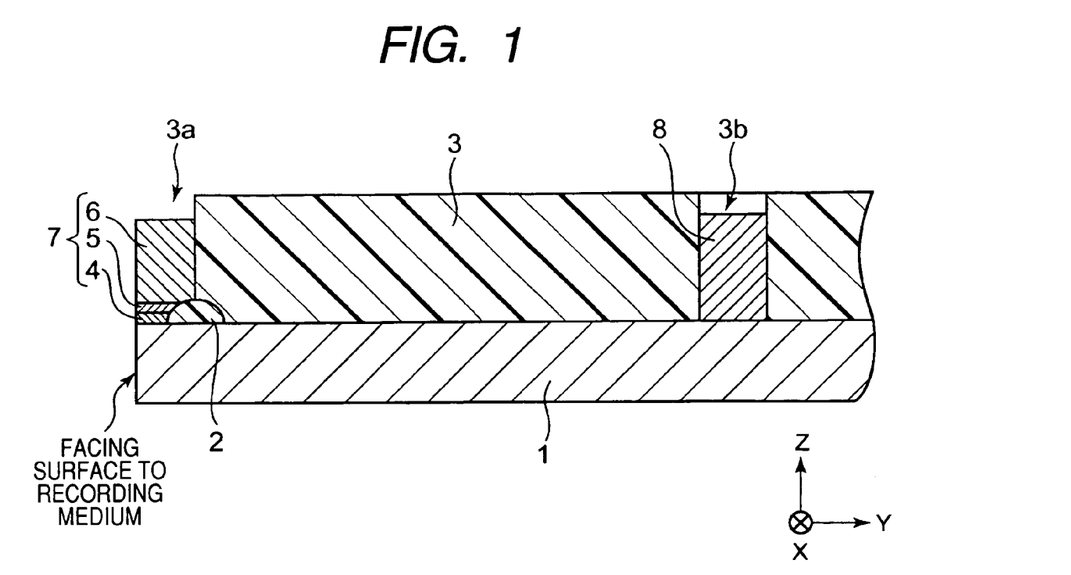
FIG. 1 is a sectional view that illustrates the manufacturing method for a thin magnetic head according to an exemplary embodiment.

In FIG. 1, a lower core layer (a first magnetic portion) 1 is plated on, for example, a reproducing head having a magnetic resistant effect element, not shown in FIGS. The lower core layer 1 is plated by a magnetic material such as NiFe Alloy.

After forming, for example, a magnetic base layer not shown in FIGS. on the lower core layer 1, a Gadolinium(Gd) layer 2, which is formed of resist, etc., is formed on a position which is away as much as a predetermined distance from a surface facing a recording medium in a height direction (Y direction shown in FIGS.). The Gd layer 2 is formed, for example, by performing a heat treatment after coating a resist layer.

In a process shown in FIG. 1, a resist layer 3 is coated on the lower core layer and the Gd layer 2, and the resist layer 3 is developed by exposure, and a magnetic pole portion forming groove 3a is formed, which has a predetermined length size from a surface facing a recording medium in a height direction (Y direction shown in FIGS.) and also formed in a predetermined width size in a track width direction (X direction shown in FIGS.). At this time, at least part of the Gd layer 2 is exposed in the magnetic pole forming groove 3a.

A magnetic pole portion (protrusion) 7, which is formed continuously in order of a lower magnetic pole layer 4, a gap layer 5 and an upper magnetic pole layer 6 from the bottom, is plated in the magnetic pole portion forming groove 2a. Further, it may be, for example, the magnetic pole portion 7 formed of a second-story structure of the gap layer 5 and the upper magnetic pole layer 6, instead of a three-story structure. A nonmagnetic material such as NiP that can be plated is used for the gap layer 5. The lower magnetic pole layer 4 and the upper magnetic pole layer 6 are plated with magnetic materials such as NiFe Alloy, CoFe Alloy, and CoFeNi Alloy.

At the rear-end of a height direction of the resist layer 3 (Y direction shown in FIGS.), a groove 3b is formed by an, exposure development, and a connecting layer (connecting portion) 8 is plated in this groove 3b. For example, the connecting layer 8 may be a laminated structure, which is the same as the magnetic pole portion 7, it is preferable for it to be a single layer structure of a magnetic material. For example, the resist layer 3 may be removed after forming the magnetic pole portion 7. The resist layer for forming the connecting layer may be coated again from the lower core layer 1 to the magnetic pole portion 7 and the resist layer may be developed by exposure to form a groove. The connecting layer 8 may be plated in the groove.

Figure 2:
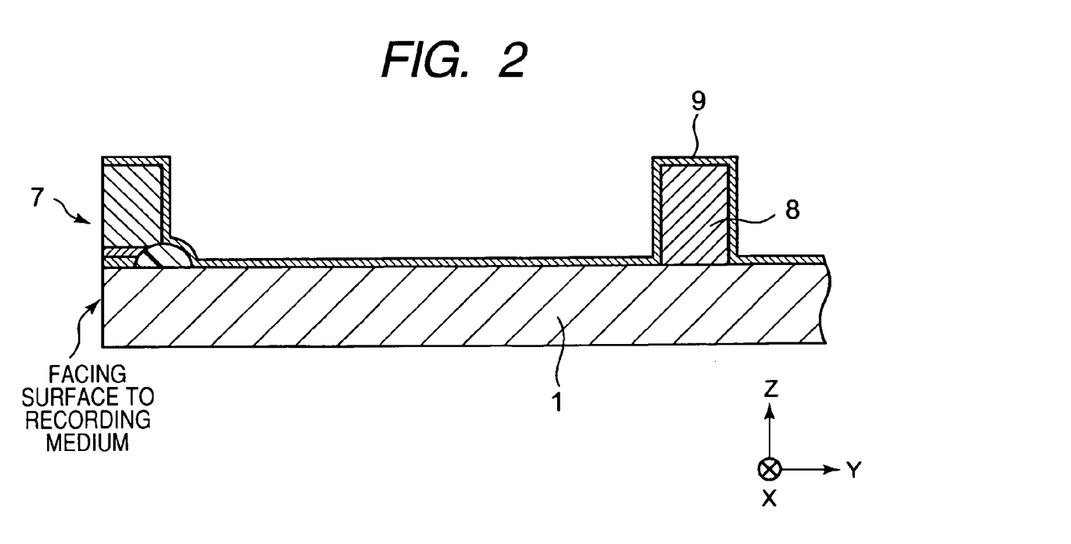
FIG. 2 is a sectional view of an exemplary embodiment performed after the process illustrated in FIG. 1.

The resist layer 3 shown in FIG. 1 is removed, and as shown in FIG. 2, an insulating base layer 9 is formed from the magnetic pole portion 7 through the lower core layer 1, and through the connecting layer 8. The insulating base layer 9 is formed by, for example, the sputter technique. It is preferable that the insulating base layer 9 is formed at least on the lower core layer 1 between the magnetic pole portion 7 and the connecting layer 8. Since a gap between the magnetic pole portion 7 and the connecting layer 8 is formed at a broad interval, the insulating base layer 9 can be formed on the lower core layer 1 by the sputter technique. The insulating base layer 9 is formed by an insulating material such as, for example, $Al_2O_3$.

Figure 3:
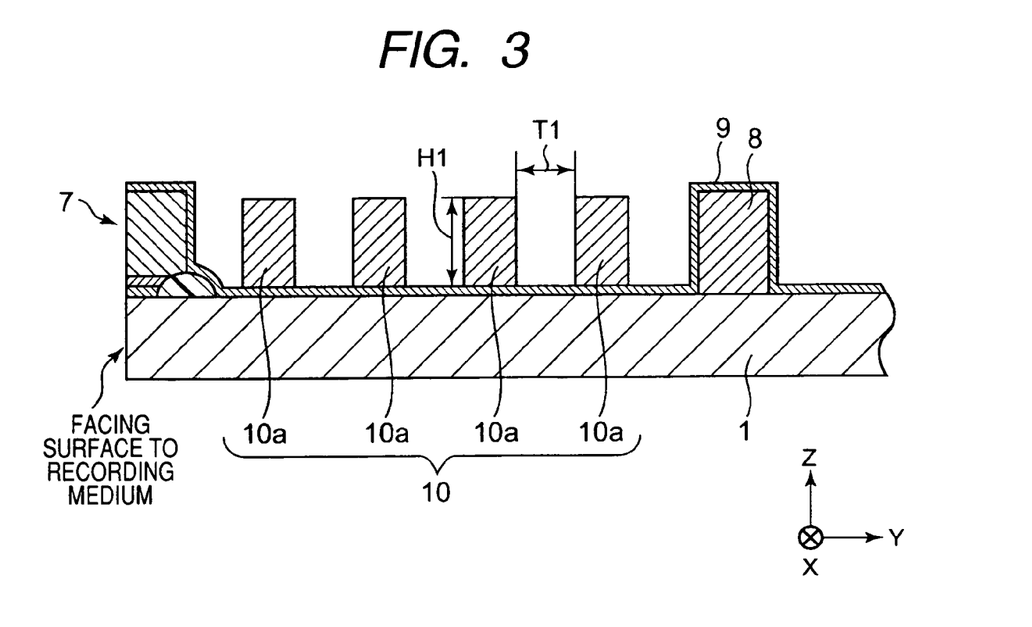
FIG. 3 is a sectional view(performed after the process illustrated in FIG. 2.

In a process shown in FIG. 3, a lower coil layer 10, for example, is patterned in a spiral shape winding around the axis of the connecting layer 8 on the insulating base layer 9. After forming a plated base layer, not shown, on the insulating base layer 9 by the sputter technique, etc., a resist layer, not shown, is coated on the plated base layer and developed by exposure to form a coil layer-shaped pattern groove on the resist layer. The coil layer is plated on the pattern groove and the plated base layer is removed besides the bottom of the lower coil layer 10 in company with the resist layer being removed. The lower coil layer 10 is formed of, for example, Cu.

The lower coil layer 10 is formed by a predetermined number of turns, and a predetermined interval (width size) T1 is spaced between conductor parts 10a of each turn. A size of the interval T1 may be different between each conductor part 10a. For example, the interval T1 is about 0.5 μm, and a height size H1 of the conductor part 10a is about 2.5 to 3.5 μm. By way of example, an interval between the conductor parts 10a is very small compared to a height of the conductor part 10a and an aspect ratio (a height size H1 of the conductor part 10a/an interval T1 between each conductor part) is very large.

Figure 4:
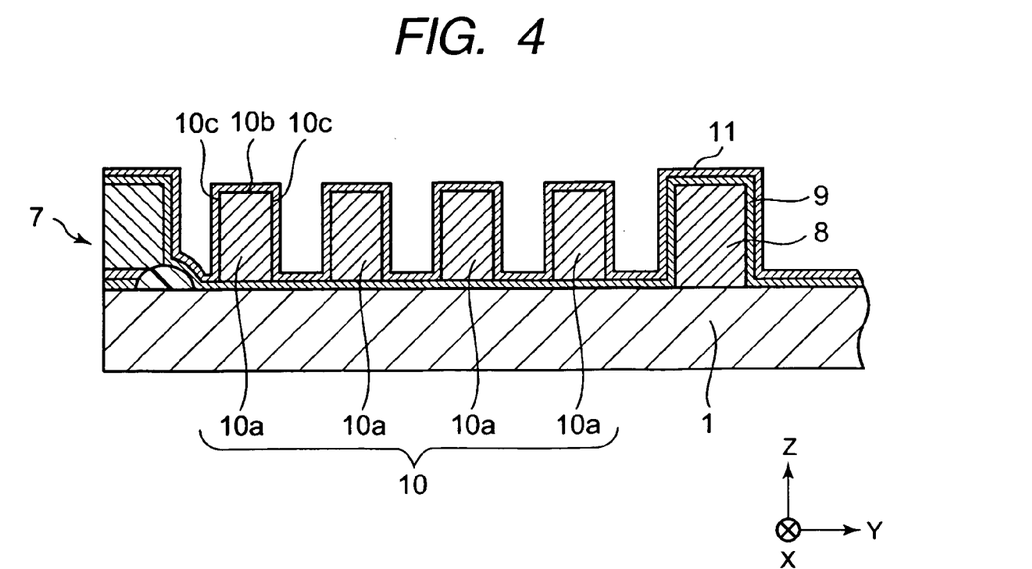
FIG. 4 is a sectional view of an exemplary embodiment performed after the process illustrated in FIG. 3.

As shown in FIG. 4, an inorganic insulating layer 11 with a thin film width is formed on an upper surface 10b and a sidewall surface 10c of each conductor part 10a, an upper surface and a sidewall surface of the magnetic pole portion 7, an upper surface and a sidewall surface of a connecting portion 8, and the lower core layer 1 exposed from a gap of each conductor part 10a. Although the inorganic insulating layer 11 may be formed along at least the sidewall surface 10c of each conductor part 10a, the inorganic insulating layer 11 is formed on every exposed surface in FIG. 4.

It is preferable that the inorganic insulating layer 11 is formed by a chemical vapor deposition method (CVD). Using the CVD, at least the inorganic insulating layer 11 can be properly formed on the sidewall surface 10c of each conductor part 10a. Preferably, the inorganic insulating layer 11 is formed of an atomic layer deposition method (ALD). The atomic layer deposition method (ALD) is a method of forming a layer with a predetermined film width by piling an atomic layer up, layer by layer. According to this method, the inorganic insulating layer 11 can be formed along the sidewall surface 10c more properly also between each conductor parts 10a having a high aspect ratio.

As described above, the inorganic insulating layer 11 may be formed by a thin film width of about 500 to 1000 Å. In this embodiment, a gap of each conductor part 10a is not filled by the inorganic insulating layer 11. If the gap of each conductor part 10a is filled by the inorganic insulating layer 11, a cavity is easily formed in the vicinity of a lower edge of each conductor part 10a. In addition, even though the cavity formation could be suppressed by using the atomic layer deposition method, etc., a manufacturing cost increases due to a very long manufacturing time. The formation of the inorganic insulating layer 11 along at least the sidewall surface 10c of the conductor part 10a will be enough.

Figure 5:
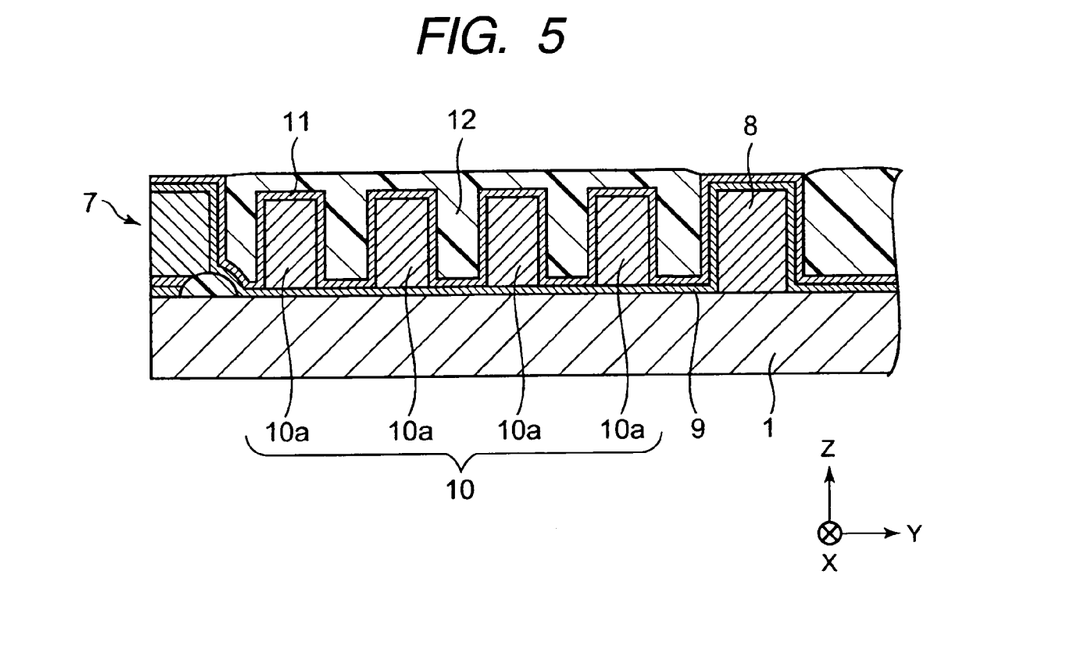
FIG. 5 is a sectional view of an exemplary embodiment performed after the process illustrated in FIG. 4.

As shown in FIG. 5, the conductor part 10a is covered with the organic insulating layer 12, together with filling a gap of each conductor part 10a with an organic insulating layer 12 formed by an organic material such as a resist. Thereafter, the organic insulating layer 12 is thermally treated if required.

Figure 6:
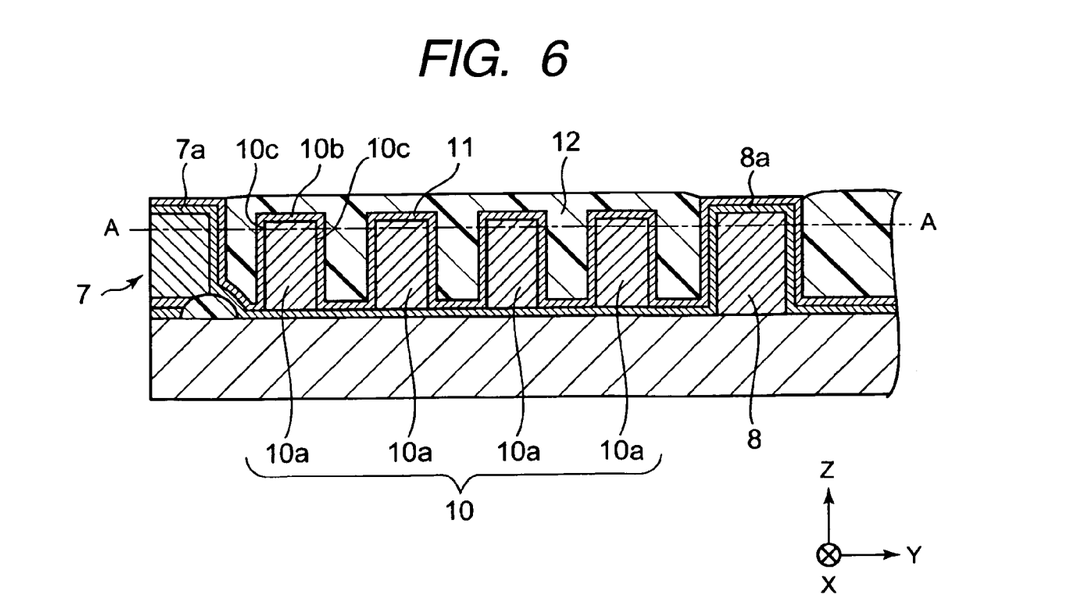
FIG. 6 is a sectional view of an exemplary embodiment performed after the process illustrated in FIG. 5.
Figure 7:
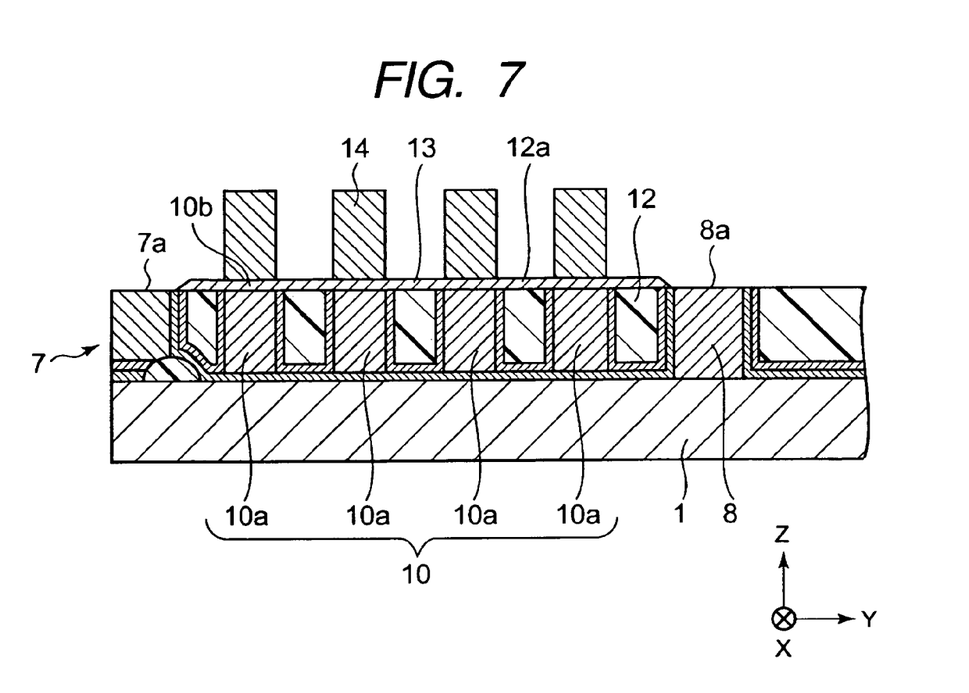
FIG. 7 is a sectional view of an exemplary embodiment performed after the process illustrated in FIG. 6.

As shown in FIG. 6, an upper surface 7a of the magnetic pole portion 7, an upper surface 10 of each conductor part 10a and an upper surface 8a of each connecting layer 8 are grinded with the organic insulating layer 12 and the inorganic insulating layer 11 to a predetermined grinding position A-A by a CMP (Chemical Mechanical Planarization) technique.

In this embodiment, since the inorganic insulating layer 11 is formed on the sidewall surface 10c of each conductor part 10a, in case the organic insulating layer 12 and the inorganic insulating layer 11 formed on the upper surface 10b of the conductor part 10a is removed, an inorganic insulating layer 11 formed on the sidewall surface 10c is exposed in the periphery of the conductor part 10a.

The hard inorganic insulating layer 11 becomes exposed between the soft conductor part 10a and the organic insulating layer 12. Even though the upper surface 10b of the conductor part 10a is grinded, it is possible, for example, to prevent a shear drop from being generated on the upper surface 10b. In addition, it is preferable that an inorganic insulating material used for the inorganic insulating layer 11 is selected from a material with a grinding speed slower than the conductor part 10a and the organic insulating layer 12. For example, it is preferable to select the inorganic insulating layer 11 from at least one of $Al_2O_3$, $HfO_2$, $TiO_2$, and $Ta_2O_5$. For example, the inorganic insulating layer 11 may be formed by a structure of more than two layers. $Al_2O_3$ and $HfO_2$ can form a film by an atomic layer deposition method (ALD Atomic Layer Deposition), and $TiO_2$ and $Ta_2O_5$ can form a film by a chemical vapor deposition method (CVD, Chemical Vapor Deposition).

The inorganic insulating layer 11 formed on the sidewall surface 10c of the conductor part 10a will not be etched by CMP before the conductor part 10a, and thereby it becomes possible to prevent a shear drop from being generated on the upper surface 10b of the conductor part 10a.

It is preferable that the inorganic insulating layer 11 has a material with a grinding speed faster than the case of using $SiO_2$ at the inorganic insulating layer 11. Since a grinding speed becomes very slow in case of using specific slurry selected to grind the magnetic pole portion 7, the conductor part 10a and the connecting layer 8 with CMP, $SiO_2$ can not properly grind the inorganic insulating layer 11. Since the grinding speed of $SiO_2$ is too slow, the upper surface 10b of the conductor part 10a is further etched, which results in a film width of the conductor part 10a being easily thinner than a predetermined value, and therefore a thin film magnetic head suitable for improving PTP can not be manufactured.

In another embodiment, $Al_2O_3$ is used in the inorganic insulating layer 11 to make the grinding speed faster than the case of using $SiO_2$, and the inorganic insulating layer 11 is also properly grinded with the magnetic pole portion 7, the conductor part 10*a*, the connecting layer 8 and the organic insulating layer 12.

According to FIG. 5, a gap of each conductor part 10*a* is being filled with the organic insulating layer 12. A defect of a cavity being formed between each conductor part 10*a* is not generated, therefore the gap of each of the conductor part 10*a* can be filled properly and simply.

Since a generation of a shear drop on the upper surface 10*b* of each conductor part 10*a* can be properly prevented as described above. According to a manufacturing method of an exemplary embodiment, a short circuit of each conductor part 10*a* can be prevented, and, the gap of each conductor part 10*a* can be filled properly by an insulating layer.

The manufacturing process until a thin film magnetic head is completed will be described. In a process shown in FIG. 7, an insulating base layer 13 is formed on the upper surface 10*b* of each conductor part 10*a* and the upper surface 12*a* of the organic insulating layer 12 planar with the upper surface 7*a* of the magnetic pole portion 7 and the upper surface 8*a* of the connecting layer 8. The upper coil layer 14 is formed on the insulating base layer 13 by the method same as the lower coil layer 10.

Figure 8:
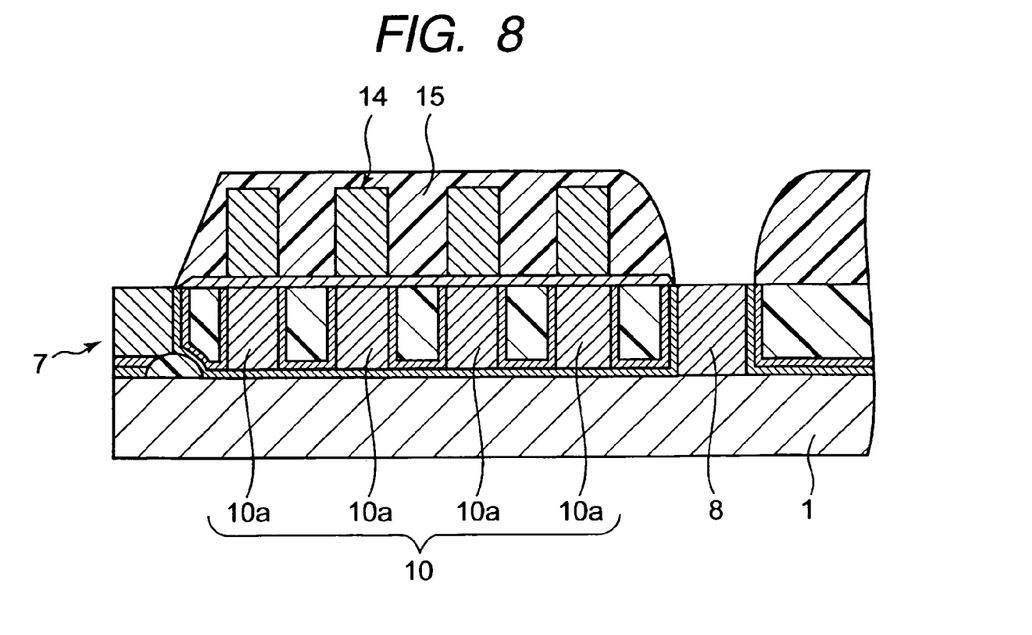
FIG. 8 is a sectional view performed after the process illustrated in FIG. 7.
Figure 9:
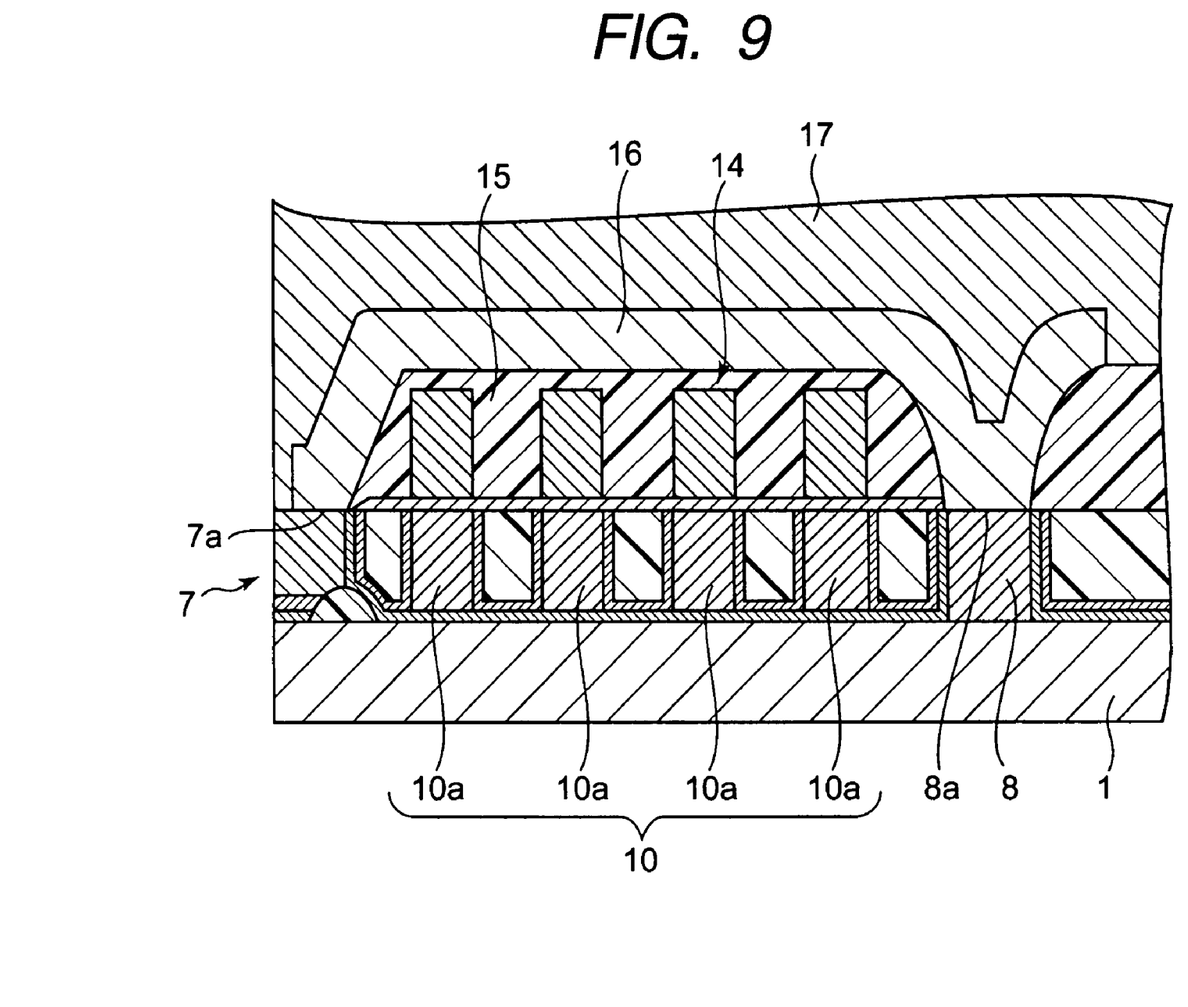
FIG. 9 is a sectional view of an exemplary embodiment performed after the process illustrated in FIG. 8, and a completed sectional view of the thin film magnetic head according to an exemplary embodiment.

As shown in FIG. 8, the upper coil layer 14 is covered with a coil insulating layer 15 made of an organic material. As shown in FIG. 9, an upper core layer (second magnetic portion) 16 is patterned from an upper surface 7*a* of the magnetic pole portion 7 to the coil insulating layer 15 and an upper surface 8*a* of the connecting layer 8, by a method such as a frame plating method. A protection layer 17 made of an insulating material such as Al$_2$O$_3$ is formed on the upper core layer 16. The upper core layer 17 is magnetically connected to the lower core layer 1 through the connecting layer 8.

Figure 10:
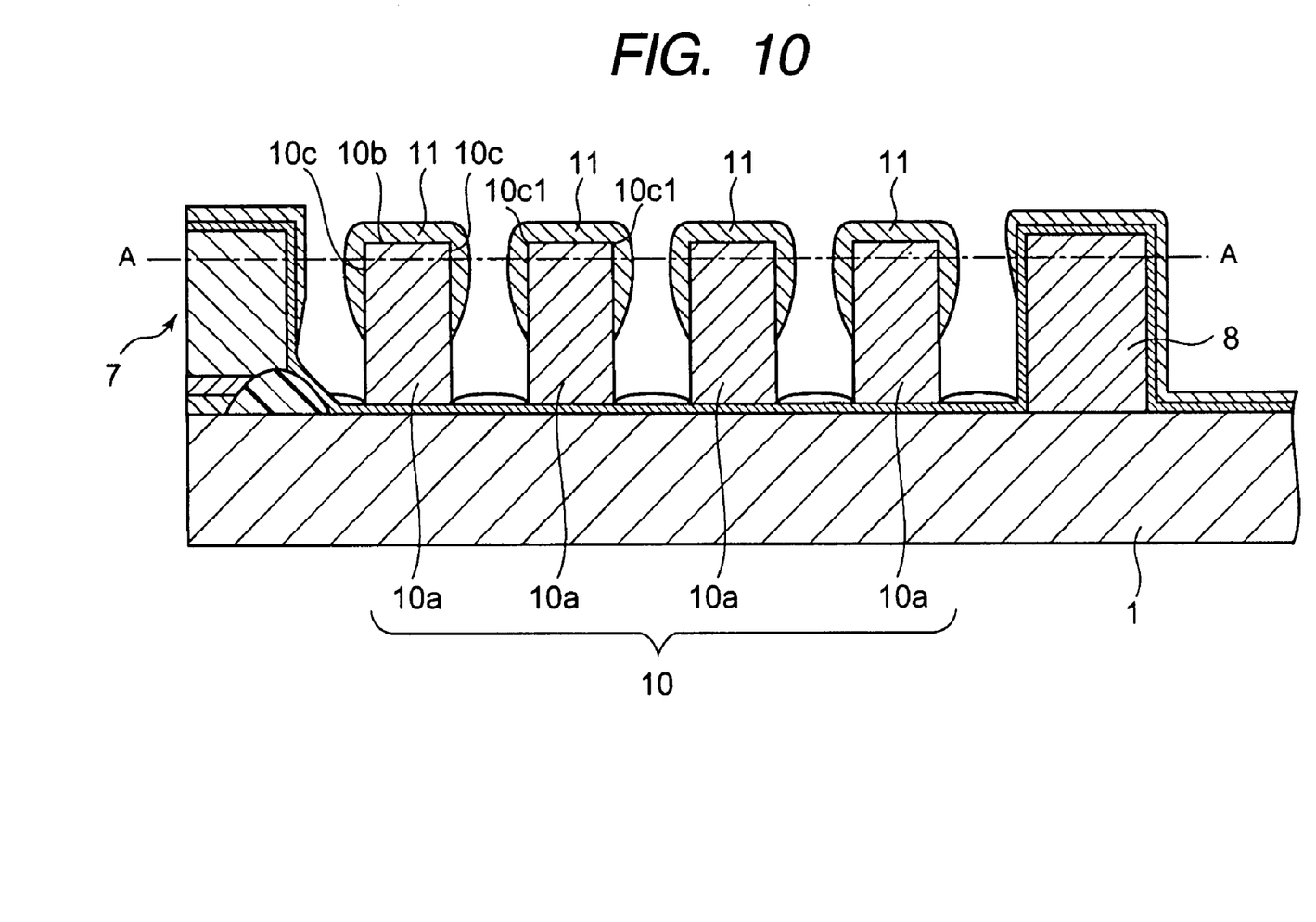
FIG. 10 is a sectional view, which can be performed instead of the process shown in FIG. 4.

Although it is permissible that the inorganic insulating layer 11 can not be formed on the whole sidewall surface 10*c* of the conductor part 10*a* as shown in FIG. 4, and as shown in FIG. 10, it is necessary to form the inorganic insulating layer 11 from an upper edge 10*c*1 of the upper surface 10*b* and the sidewall surface 10*c* of each conductor part 10*a*, along the sidewall surface 10*c*, to at least a part lower than A-A, a grinding position by CMP. During a process of grinding an upper surface 10*b* of the conductor part 10*a* by CMP, the inorganic insulating layer 11 is always exposed in a periphery of the conductor part 10*a*, and a shear drop of the conductor part 10*a* can be suppressed properly.

If the inorganic insulating layer 11 can be formed not by a chemical vapor deposition method but a physical evaporation method such as a sputter technique to the bottom of the grinding position A-A as shown in FIG. 10, the sputter technique can also be applied. It is preferable to use a chemical vapor deposition method, since the method is capable of more definitely forming the inorganic insulating layer 11 on the sidewall surface 10*c* of the conductor part 10*a* with a high aspect ratio, to the bottom of the grinding position A-A.

In a thin film magnetic head shown in FIG. 9, since the upper surface 10*b* of each conductor part 10*a* forming the lower coil layer 10 is flush with the upper surface 7*a* of the magnetic pole portion 7, a height size of each conductor part 10*a* is formed to the maximum height, a coil resistance can be lowered, and thereby it is formed of a thin film magnetic head with an improved PTP. A gap of each conductor part 10*a* is insulated properly to also be electrically stable.

An embodiment of a thin film magnetic head is not limited to that of FIG. 9. For example, in a thin film magnetic head shown in FIG. 11, a protruding layer (protrusion) 32 made of a magnetic material is formed on a surface facing a recording medium on a lower core layer (the first magnetic portion) 29, a connecting layer (connecting portion) 33 made of a magnetic material is formed on a height side of the lower core layer 29. A lower coil layer 35 is formed in a space of the protruding layer 32, the lower core layer 29 and the connecting layer 33, through an insulating base layer 34.

Figure 11:
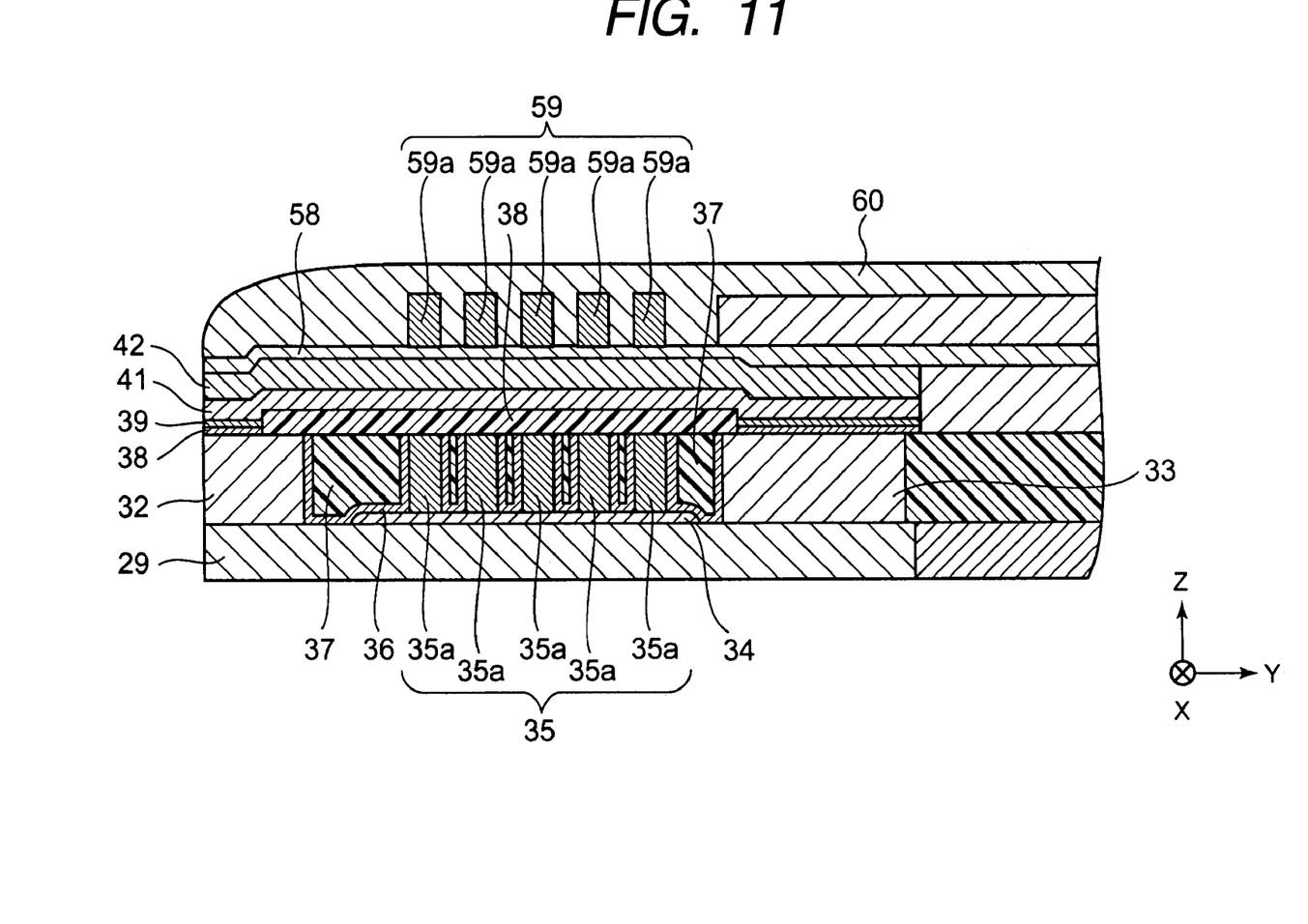
FIG. 11 is a sectional view of a thin film magnetic head with a configuration different from FIG. 9.

As shown in FIG. 11, an inorganic insulating layer 36 is formed on a sidewall surface of each conductor part 35*a* constituting the lower coil layer 35, and a gap of each conductor part 35*a* is filled with an organic insulating layer 37.

As shown in FIG. 11 an upper surface of the protruding layer 32, an upper surface of the conductor part 35*a*, an upper surface of the connecting layer 33 and an upper surface of the organic insulating layer 37 are flush with each other.

As shown in FIG. 11, for example, an insulating layer 38 made of an organic material is formed on the lower coil layer 35, a lower magnetic pole layer 38 and a gap layer 39 is plated in this order from the bottom, on a surface facing a recording medium and on a height side of the insulating layer 38, an upper magnetic pole layer (part of the second magnetic portion) 41 is plated from the gap layer 39 to the insulating layer 38, and an upper core layer (part of the second magnetic portion) 42 is formed on the upper magnetic pole layer 41. On the upper core layer 42, an insulating layer 58 made of, for example, an inorganic insulating material such as Al$_2$O$_3$ or SiO$_2$ is formed, and an upper coil layer 59 is formed on the insulating layer 58. A protection layer 60 made of such as Al$_2$O$_3$ is formed on the upper coil layer 59.

In FIG. 11, each conductor part 35*a* constituting the lower coil layer 35 and each conductor part 59*a* constituting the upper coil layer 59 are provided plurally in a predetermined interval respectively, the conductor part 35*a* of the lower coil layer 35 and the conductor part 59*a* are conductively connected through a conductive connecting portion (not illustrated), the lower coil layer 35, the upper coil layer 59 and the connecting portion is one coil, and is precisely formed by winding around the axis of the upper magnetic pole layer 41 and the upper core layer 42.

In a thin film magnetic head with a structure shown in FIG. 11, since a grinding process using CMP technique, etc. is performed so as to arrange an upper surface of the protruding layer 32, an upper surface of the conductor part 35*a* and an upper surface of the connecting layer 33 in a flush, a generation of a shear drop on the conductor part 35*a* by the grinding process can be prevented properly by at least forming the inorganic insulating layer 36 on a sidewall surface of the conductor part 35*a*. Further, by filling a gap of each conductor part 35*a* with the organic insulating layer 37, a gap of each conductor part 35*a* can be filled without forming a cavity.

Various embodiments described herein can be used alone or in combination with one another. The forgoing detailed description has described only a few of the many possible implementations of the present invention. For this reason, this detailed description is intended by way of illustration, and not by way of limitation. It is only the following claims, including all equivalents that are intended to define the scope of this invention.

What is claimed is:

1. A manufacturing method of a thin film magnetic head, the method comprising the processes of:

(a) forming a protrusion on a side of a surface facing a recording medium on a first magnetic portion, and a connecting portion, on a height side on the first magnetic portion;
(b) forming a coil layer between the protrusion and the connecting portion on the first magnetic portion, through an insulating base layer;
(c) forming an inorganic insulating layer along at least a sidewall surface of each conductor part constituting the coil layer;
(d) filling a gap between each conductor part with an organic insulating layer;
(e) grinding an upper surface of the protrusion, an upper surface of each conductor part, and an upper surface of the connecting portion to a predetermined position with the organic insulating layer and the inorganic insulating layer to expose each upper surface of the protrusion, each conductor part and connecting portion coplanarly; and
(f) forming a second magnetic portion from the protrusion to the connecting portion.

2. The manufacturing method of the thin film magnetic head according to claim 1, wherein in the (c) process, the inorganic insulating layer is formed from an upper edge between the upper surface and the sidewall surface of each conductor part along the sidewall surface, to at least a side lower than the grinding position in the (e) process.

3. The manufacturing method of the thin film magnetic head according to claim 1, wherein the inorganic insulating layer is formed by a chemical vapor deposition method.

4. The manufacturing method of the thin film magnetic head according to claim 3, wherein the inorganic insulating layer is formed by an atomic layer deposition method.

5. The manufacturing method of the thin film magnetic head according to claim 1, wherein an inorganic insulating material used for the inorganic insulating layer is selected from materials with a grinding speed slower than that of the conductor part and the organic insulating layer.

6. The manufacturing method of the thin film magnetic head according to claim 5, wherein the inorganic insulating layer is selected from at least one of $Al_2O_3$, $HfO_2$, $TiO_2$ and $Ta_2O_5$.

* * * * *